United States Patent
Kizaki et al.

(10) Patent No.: US 8,420,039 B2
(45) Date of Patent: Apr. 16, 2013

(54) SILICON OXIDE AND NEGATIVE ELECTRODE MATERIAL FOR LITHIUM-ION SECONDARY BATTERY

(75) Inventors: Shingo Kizaki, Amagasaki (JP); Hideaki Kanno, Amagasaki (JP)

(73) Assignee: Osaka Titanium Technologies Co., Ltd., Hyogo (JP)

(*) Notice: Subject to any disclaimer, the term of this patent is extended or adjusted under 35 U.S.C. 154(b) by 0 days.

(21) Appl. No.: 13/390,138

(22) PCT Filed: Jun. 17, 2010

(86) PCT No.: PCT/JP2010/004023
§ 371 (c)(1), (2), (4) Date: Feb. 13, 2012

(87) PCT Pub. No.: WO2011/030486
PCT Pub. Date: Mar. 17, 2011

(65) Prior Publication Data
US 2012/0156120 A1  Jun. 21, 2012

(30) Foreign Application Priority Data
Sep. 10, 2009  (JP) .................. 2009-209675

(51) Int. Cl.
*C01B 15/14* (2006.01)
(52) U.S. Cl.
USPC ..................................... 423/325
(58) Field of Classification Search ............ 423/325
See application file for complete search history.

(56) References Cited

U.S. PATENT DOCUMENTS
2006/0099507 A1* 5/2006 Kogetsu et al. ............ 429/218.1

FOREIGN PATENT DOCUMENTS
| JP | 10-050312 | 2/1998 |
| JP | 2997741 | 11/1999 |
| JP | 2004-47404 | 2/2004 |
| WO | 2006/011290 | 2/2006 |

* cited by examiner

Primary Examiner — Colleen Dunn
Assistant Examiner — Haytham Soliman
(74) Attorney, Agent, or Firm — Clark & Brody

(57) ABSTRACT

A silicon oxide in the form of powder is represented by $SiO_x$, wherein, when the silicon oxide is measured by use of an X-ray diffractometer comprising a sealed tube light source as a light source and a high speed detector as a detector, a halo is detected at $20° \leq 2\theta \leq 40°$, and a peak is detected at the highest quartz line position therein. The height P1 of the halo and the height P2 of the peak at the highest quartz line position satisfy $P2/P1 \leq 0.05$. This silicon oxide is used as the negative electrode active material, whereby a lithium-ion secondary battery having stable initial efficiency and cycle characteristic can be obtained. The x of the $SiO_x$ is preferably $0.7 < x < 1.5$. A negative electrode material for lithium-ion secondary battery contains not less than 20 mass % of this silicon oxide as a negative electrode active material.

3 Claims, 2 Drawing Sheets

US 8,420,039 B2

SILICON OXIDE AND NEGATIVE ELECTRODE MATERIAL FOR LITHIUM-ION SECONDARY BATTERY

TECHNICAL FIELD

The present invention relates to a silicon oxide which can be used as a negative electrode active material of a lithium-ion secondary battery having a stable initial efficiency and cycle characteristic, and a negative electrode material for a lithium-ion secondary battery using this silicon oxide.

BACKGROUND ART

In accordance with recent noticeable developments in portable electronic equipments, communication equipments and the like, the development of secondary batteries with high energy density is strongly demanded from the viewpoint of economic efficiency and reduction in size and weight of the equipment. Currently available secondary batteries with high energy density include a nickel-cadmium battery, a nickel-hydrogen battery, a lithium-ion secondary battery, a polymer battery and the like. Among these batteries, the demand for the lithium-ion secondary battery is strongly growing in the power source market due to its dramatically enhanced life and capacity, compared with the nickel cadmium battery or nickel-hydrogen battery.

FIG. 1 is a view indicating a configuration example of a coin-shaped lithium-ion secondary battery. The lithium-ion secondary battery includes, as shown in FIG. 1, a positive electrode 1, a negative electrode 2, a separator 3 impregnated with electrolyte, and a gasket 4 intended for maintaining the electric insulation between the positive electrode 1 and the negative electrode 2 and sealing what are contained inside the battery. When charging or discharging is performed, lithium ions move between the positive electrode 1 and the negative electrode 2 through the electrolyte in the separator 3.

The positive electrode 1 includes a counter electrode case 1a, a counter electrode current collector 1b, a counter electrode 1c, and lithium cobaltate ($LiCoO_3$) or manganese spinel ($LiMn_2O_4$) is mainly used for the counter electrode 1c. The negative electrode 2 includes a working electrode case 2a, a working electrode current collector 2b, and a working electrode 2c, and a negative electrode material used for the working electrode 2c is generally composed of an active material capable of occluding and releasing lithium ions (negative electrode active material), a conductivity agent, and a binder.

As the negative electrode active material for a lithium-ion secondary battery, a composite oxide of lithium and boron, a composite oxide of lithium and transition metal (V, Fe, Cr, Mo, Ni, etc.), a compound containing Si, Ge or Sn, nitrogen (N), and oxygen (O), Si particle whose surface is coated with a carbon layer by means of chemical vapor deposition, and the like have been proposed in the past.

However, each of these negative electrode active materials noticeably deteriorates due to generation of dendrite or a passivated compound on the electrode according to repeated charging and discharging, or shows an increase in the expansion or contraction at the time of occlusion or release of lithium ions, although it can improve the charge and discharge capacities to enhance the energy density. Therefore, lithium-ion secondary batteries using these negative electrode active materials do not have sufficient maintainability of discharge capacity in repeated charging and discharging (hereinafter referred to as "cycle characteristic"). Further, the ratio of discharge capacity to charge capacity just after production (discharge capacity/charge capacity, hereinafter referred to as "initial efficiency") is also insufficient.

On the other hand, it has been attempted to use a silicon oxide represented by $SiO_x$ ($0<x \leqq 2$), such as SiO, as the negative electrode active material. The silicon oxide can be a negative electrode active material having much increased valid charge and discharge capacities since it is low (less noble) in electrode potential to lithium, and can reversibly occlude and release lithium ions without deterioration such as collapse of crystal structure or generation of irreversible substances attributable to the occlusion and release of lithium ions during charging and discharging. Therefore, the silicon oxide can be expected, by using it as the negative electrode active material, to provide a secondary battery high in voltage and energy density and also excellent in charge-discharge characteristic and cycle characteristic.

As efforts about the above-mentioned negative electrode active material, for example, a nonaqueous electrolyte secondary battery using a silicon oxide, which allows occlusion and release of lithium ions, as the negative electrode active material is proposed in Patent Literature 1. This proposed silicon oxide contains lithium in its crystal structure or amorphous structure, and constitutes composite oxides with lithium and silicon so that lithium ions can be occluded and released by electrochemical reaction in a nonaqueous electrolyte.

In the secondary battery proposed in Patent Literature 1, a high-capacity negative electrode active material can be obtained. However, according to the present inventors' investigations, there is still room for further improvements toward the practical use since the irreversible capacity at the time of initial charging and discharging is significantly notable (namely, the initial efficiency is not sufficient), and the cycle characteristic does not reach a practical level sufficiently

CITATION LIST

Patent Literature

PATENT LITERATURE 1: Japanese Patent No. 2997741

SUMMARY OF INVENTION

Technical Problem

As described above, the negative electrode active materials using the silicon oxide, which have been proposed so far, have a problem in which they are not developed to a practical level with respect to the initial efficiency and cycle characteristic of the lithium-ion secondary battery. Further, lithium-ion secondary batteries using pulverized powders of the silicon oxide as the negative electrode have such a problem that there are large variations in initial efficiency and cycle characteristic.

In consideration of these problems, the present invention has been made and has an object to provide silicon oxides used for a negative electrode active material of a lithium-secondary battery having a stable initial efficiency and cycle characteristic, and a negative electrode material for a lithium-ion secondary battery using this negative electrode active material.

Solution to Problem

In order to solve the above-mentioned problems, the present inventors made detailed investigations on various kinds of pulverized powders of $SiO_x$. As an analyzer therefor, a specific X-ray diffractometer (XRD) comprising a sealed tube light source as a light source and a high speed detector as an X-ray detector was used.

FIG. 2 is a view indicating a relationship of 2θ and diffraction intensity for the pulverized powders of $SiO_x$, the relationship being obtained using the XRD comprising the sealed tube light source and the high speed detector (hereinafter referred to as "XRD chart"), the θ being an angle between X-ray and a sample surface. As a result of analyses using the XRD, as shown in the same figure, it was found that pulverized powders of $SiO_x$ satisfying $0.7<x<1.5$ shows a sharp peak (hereinafter referred to as "quartz line highest peak") at a position corresponding to the quartz line highest peak ($2θ=26.2°±1°$) within an $SiO_x$-derived broad peak (hereinafter referred to as a "halo") within a range of $20°≦2θ≦40°$. This quartz line highest peak was not discernible when the same sample was analyzed using an ordinary XRD comprising a conventional light source and X-ray detector.

As a result of further investigations, the present inventors found that the intensity of the quartz line highest peak and the intensity of halo of $SiO_x$ are correlated with variations in initial efficiency and cycle characteristic of a lithium-ion secondary battery using this $SiO_x$ as the negative electrode active material. Concretely, it was found that, when the ratio P2/P1 of height P2 of quartz line highest peak to height P1 of halo in the XRD chart is not more than 0.05, variations in initial efficiency and cycle characteristic are sufficiently minimized. As shown in FIG. 2, a background-removed height is taken as the height P1 of halo in order to obtain a signal intensity attributable to $SiO_x$ only. In regards to the height P2 of quartz line highest peak, a portion protruded from the halo is regarded as the height in order to obtain a signal intensity attributed to quartz only.

The present invention is achieved based on the above-mentioned knowledge, and the summary thereof lies in (1) a silicon oxide and (2) a negative electrode material for lithium-ion secondary battery described below.

(1) A silicon oxide in the form of powder, as being used for a negative electrode active material of a lithium-ion secondary battery and being represented by $SiO_x$, in which, when the silicon oxide is measured by use of a specific X-ray diffractometer comprising a sealed tube light source as the light source and a high speed detector as a detector, a halo is detected at $20°≦2θ≦40°$, and a peak is detected at the highest quartz line position therein, and the height P1 of the halo and the height P2 of the peak at the highest quartz line position satisfy $P2/P1≦0.05$.

In the silicon oxide described in (1), x of the $SiO_x$ is preferably $0.7<x<1.5$.

(2) A negative electrode material for lithium-ion secondary battery which contains not less than 20 mass % of the silicon oxide described in (1).

In the present invention, "the negative electrode material for lithium-ion secondary battery contains not less than Y mass % of silicon oxides" means that the ratio of the mass of the silicon oxide to the total mass of constituents except a binder among the constituents of the negative electrode material for lithium-ion secondary battery is not less than Y %.

Advantageous Effects of Invention

A lithium-ion secondary battery having a stable initial efficiency and cycle characteristic can be obtained by using the silicon oxide of the present invention as a negative electrode active material and using the negative electrode material for the lithium-ion secondary battery of the present invention.

DESCRIPTION OF EMBODIMENTS

A silicon oxide of the present invention and a negative electrode material for lithium-ion secondary battery using the same will be then described.

1. Silicon Oxide

The silicon oxide of the present invention is a powdery silicon oxide which is used for a negative electrode active material of a lithium-ion secondary battery and is represented by $SiO_x$. The silicon oxide is characterized in that, when it is measured with a specific X-ray diffractometer comprising a sealed tube light source as a light source and a high speed detector as a detector, a halo is detected at $20°≦2θ≦40°$, a peak is detected at the quartz line highest position therein, and the height P1 of the halo and the height P2 of the peak at the quartz line highest position satisfy $P2/P1≦0.05$.

Figure 2:
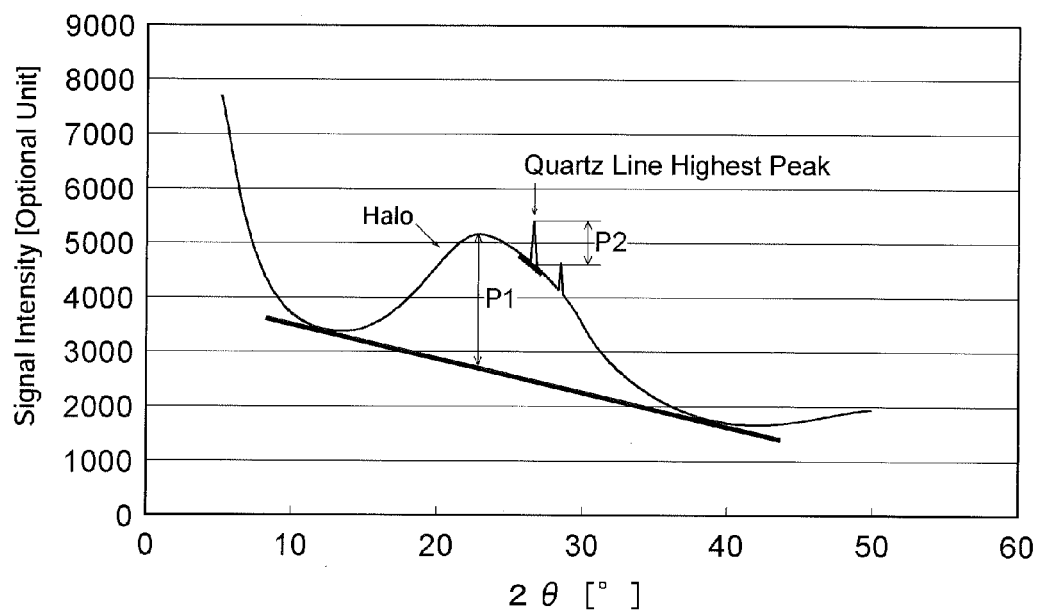
FIG. 2 is an XRD chart on pulverized powders of $SiO_x$, which was obtained using a specific XRD comprising a sealed tube light source and a high speed detector.

As the cause of generation of a quartz line highest peak as shown in the above-mentioned FIG. 2 in an XRD chart which is obtained for the silicon oxide ($SiO_x$) measured using the XRD comprising the sealed tube light source and the high speed detector, the presence of a trace of quartz in the silicon oxide can be recognized from two reasons described below.

Reason 1: In production of silicon oxide, fine powders of quartz contained in silicon dioxide powders as being a raw material reach a precipitation substrate together with gaseous SiO generated by heating, and are incorporated into $SiO_x$ precipitated on the precipitation substrate.

Reason 2: A part of $SiO_x$ is separated into Si and $SiO_2$ by an impact at the time of pulverization of the silicon oxide precipitated on the precipitation substrate and quartz is generated.

As described above, when the height P1 of halo and the height P2 of highest line peak satisfy $P2/P1≦0.05$, namely when the ratio of quartz existing in the silicon oxide is not more than a predetermined value, variations in the initial efficiency and cycle characteristic are sufficiently minimized.

In relation to the above-mentioned Reason 1, the quartz to be migrated into the silicon oxide can be reduced by (a) reducing the reaction rate of raw material in the production or by (b) micronizing the silicon dioxide powders that are the raw material. As a concrete example of the method (a), an amount of reaction of the raw material per unit time relative to the mass of the raw material at the start of reaction is defined as the reaction rate, and this reaction rate is set to not more than 0.4%/min. As a concrete example of the method (b), with respect to the particle size of the raw material, particle size $D_{90}$ of cumulative frequency 90% in a cumulative distribution curve of particle size is set to below 25 μm.

In relation to the above-mentioned Reason 2, the quartz to be generated in the silicon oxide can be reduced by (c) applying, as the pulverizing method, a method with minimized impact. Concretely, use of a ball mill or planetary ball mill with its rotating speed being set to not more than 10 rpm can be cited as an example.

The silicon oxide precipitated on the precipitation substrate by applying the method (a) or (b) is pulverized by applying the method (c), whereby powders of the silicon oxide satisfying P2/P1≦0.05 with P1 and P2 indicating a halo height and a quartz line highest peak height, respectively.

For the silicon oxide ($SiO_x$) of the invention, 0.7<x<1.5 is preferable. When the x is 0.7 or less, the cycle characteristic of a lithium-ion secondary battery using this silicon oxide as the negative electrode active material is decreased. On the other hand, when the x is 1.5 or more, the initial efficiency of the lithium-ion secondary battery using this as the negative electrode active material is decreased.

2. Method of Producing Silicon Oxide

Figure 3:
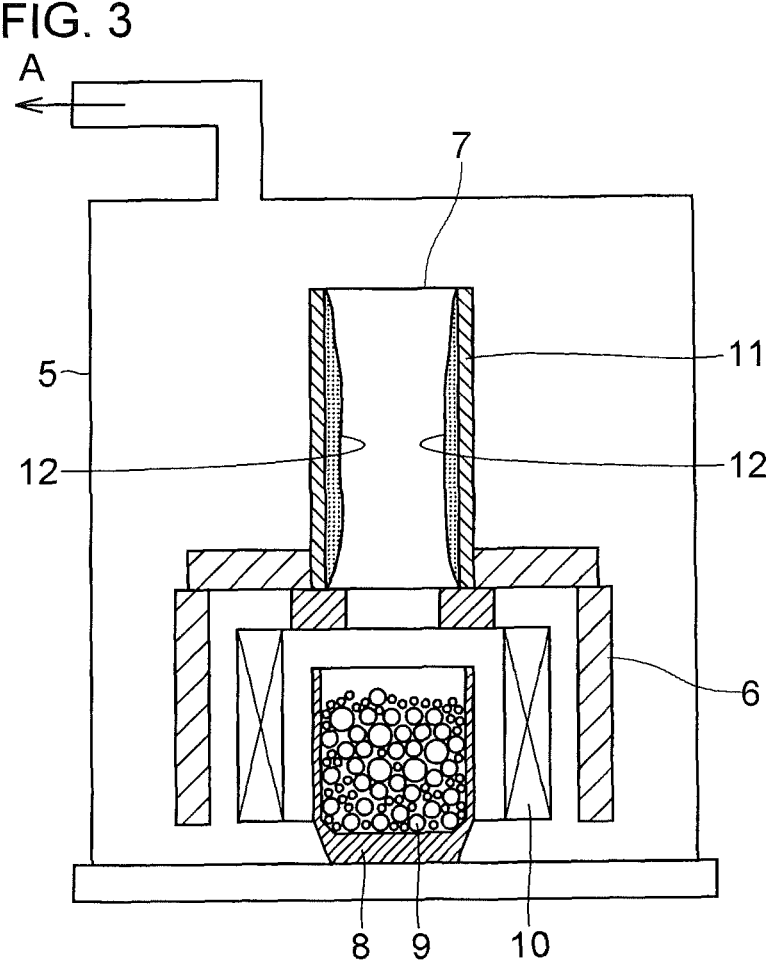
FIG. 3 is a view indicating a configuration example of a production equipment for a silicon oxide.

FIG. 3 is a view indicating a configuration example of a production equipment for a silicon oxide. This equipment includes a vacuum chamber 5, a raw material chamber 6 disposed inside the vacuum chamber 5, and a precipitation chamber 7 disposed above the raw material chamber 6.

The raw material chamber 6 comprises a cylindrical body, and provided in the central part thereof are a cylindrical raw material container 8 and a heating source 10 surrounding the raw material container 8. As the heating source 10, for example, an electric heater can be used.

The precipitation chamber 7 comprises a cylindrical body disposed so as to axially coincide with the raw material container 8. A precipitation substrate 11 made of stainless steel is provided on the inner periphery of the precipitation chamber 7 so as to deposit gaseous silicon oxide generated by sublimation in the raw material chamber 6.

A vacuum device (not shown) for discharging an atmospheric gas is connected to the vacuum chamber 5 housing the raw material chamber 6 and the precipitation chamber 7 to discharge the gas in the direction of the arrow A.

When a silicon oxide is produced by use of the production equipment shown in FIG. 3, a mixed pelletized raw material 9 obtained by blending silicon powders and silicon dioxide powders as raw materials, and by mixing, pelletizing and drying is used. This mixed pelletized raw material 9 is charged into the raw material container 8, and heated in an inert gas atmosphere or vacuum to generate (sublimate) SiO. The gaseous SiO generated by sublimation ascends from the raw material chamber 6 into the precipitation chamber 7, in which it is deposited on the circumferential precipitation substrate 11, and precipitated as silicon oxides 12. Thereafter, the precipitated silicon oxide 12 is retrieved from the precipitation substrate 11, whereby the silicon oxide is obtained.

In this production process, the reaction rate of raw material is set to not more than 0.4%/min according to the above-mentioned method (a) or, with respect to the particle size of the raw material, $D_{90}$ is set to below 25 μm according to the above-mentioned method (b), whereby the quartz to be migrated into the precipitated silicon oxide 12 can be reduced. The above-mentioned method (c) is adopted as the method for pulverizing the precipitated silicon oxide into a silicon oxide in the form of powder, whereby the impact at the time of the pulverization is minimized. Thus, the silicon oxide of the present invention satisfying P2/P1≦0.05 with P1 and P2 indicating a halo height and the quartz line highest peak height, respectively, can be obtained.

3. Lithium-Ion Secondary Battery

Figure 1:
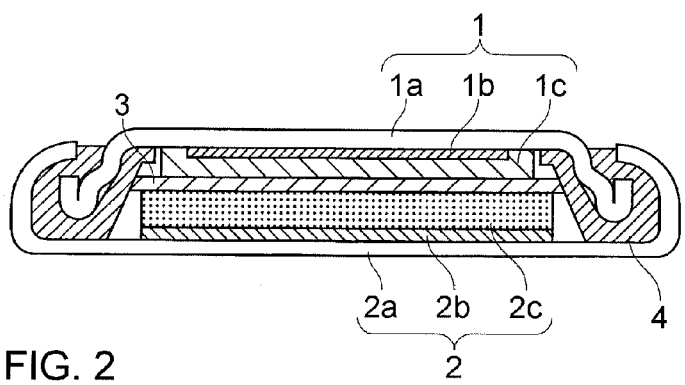
FIG. 1 is a view indicating a configuration example of a coin-shaped lithium-ion secondary battery.

A configuration example of a coin-shaped lithium-ion secondary battery, which uses the silicon oxide and negative electrode material for lithium-ion secondary battery of the present invention, will be described with reference to the above-mentioned FIG. 1. The basic configuration of the lithium-ion secondary battery shown in the same figure is as described above.

A negative electrode material used for the working electrode 2c constituting the negative electrode 2 can include the silicon oxide of the present invention (active material), other active materials, a conductivity agent, and a binder. The other active materials do not necessarily have to be added. As the conductivity agent, for example, acetylene black or carbon black can be used, and as the binder, for example, polyvinylidene fluoride can be used.

EXAMPLES

The following testing was performed to confirm the effects of the present invention, and the result thereof was evaluated.

1. Testing Condition

Using a mixed pelletized raw material prepared by blending, mixing, pelletizing and drying silicon powders and silicon dioxide powders as a raw material, a silicon oxide was precipitated on a precipitation substrate by use of the above-mentioned equipment shown in FIG. 3. The precipitated silicon oxide was pulverized into powders for 24 hours by use of an alumina-made ball mill. The conditions shown in Table 1 were used for the reaction rate of the raw material of the silicon oxide and the rotating speed of the ball mill.

TABLE 1

| Test No. | Classification | Reaction Rate of Raw Material [%/min] | Rotating Speed of Ball Mill [rpm] | P2/P1 | Initial Efficiency | | Cycle Characteristic | | Overall Evaluation |
|---|---|---|---|---|---|---|---|---|---|
| | | | | | Average [%] | Standard Deviation | Average [%] | Standard Deviation | |
| 1 | Inventive Example | 0.39 | 10 | 0.048 | 85.0 | 3.5 | 92.5 | 3.5 | ○ |
| 2 | Inventive Example | 0.21 | 10 | 0.01 | 87.6 | 1.5 | 91.3 | 0.6 | ○ |
| 3 | Comparative Example | 0.52 | 30 | 1.8 | 75.2 | 12.3 | 32.3 | 23.7 | x |

In Table 1, the "Reaction Rate of Raw Material" means an amount of reaction of the raw material per unit time relative to the mass of the raw material at the start of reaction.

With respect to this silicon oxide powders, an XRD chart was obtained using a specific X-ray diffractometer (XRD) comprising a sealed tube light source and a high speed detector. The specification of the XRD used in this testing is shown in Table 2.

TABLE 2

| | |
|---|---|
| X-Ray diffractometer | D8 ADVANCE type manufactured by Bruker AXS |
| X-Ray source | Sealed tube type (using Cu Kα-ray, Ni filter) |
| Output | 40 kV 40 mA |
| Slit | Div. Slit: 0.3° |
| Detector | LynxEye (high speed detector) |
| Scanning method | 2θ-θ continuous scan |
| Measuring range | 5-50° |
| Step width | 0.01713° |
| Counting time | 1.0 sec/step |

Using the silicon oxide powders as a negative electrode active material, a negative electrode material was produced by blending carbon black that is a conductivity agent with a binder. The blending of the raw materials of the negative electrode material was set in the proportion of silicon oxide: carbon black:binder=7:2:1. Using this negative electrode material and Li metal as a positive electrode material, the above-mentioned coin-shaped lithium-ion secondary battery shown in FIG. 1 was produced, and the initial efficiency and cycle characteristic thereof were investigated.

2. Testing Results

With respect to the silicon oxide produced in the above-mentioned condition, the peak height ratio P2/P1 was calculated from the XRD chart. With respect to five lithium-ion secondary batteries, which use either of these silicon oxides as negative electrode materials, in each test, evaluation was performed with an average and a standard deviation of initial efficiency and an average and a standard deviation of cycle characteristic as indicators. These results are shown in Table 1 together with the testing condition. An overall evaluation is shown also in the same table.

As the initial efficiency, the value of the ratio of initial discharge capacity to initial charge capacity (initial discharge capacity/initial charge capacity) of the lithium-ion secondary battery was adopted. As the cycle characteristic, the value of the ratio of discharge capacity after 100-times-charging/discharging to initial discharge capacity (discharge capacity after 100-times-charging/dischargings/initial discharge capacity) was adopted.

The meaning of signs in the overall evaluation is as follows:
x means poor, that is, the average of initial efficiency is less than 85% or the standard deviation thereof is 10 or more, or otherwise, the average of cycle characteristic is less than 90%, or the standard deviation thereof is 20 or more: on the other hand, ○ means good, that is, the average of initial efficiency is 85% or more and the standard deviation thereof is less than 10, while the average of cycle characteristic being 90% or more and the standard deviation thereof being less than 20.

With respect to each of Test Nos. 1 and 2, which are inventive examples, the peak height ratio P2/P1 satisfies P2/P1≦0.05, and the overall evaluation is ○. Since particularly Test No. 2 had the peak height ratio P2/P1 as small as 0.01, the initial efficiency and cycle characteristic of five secondary batteries showed stable values with small standard deviations in both initial efficiency and cycle characteristic.

On the other hand, with respect to Test No. 3, which is a comparative example, the peak height ratio P2/P1 was as large as 1.8, and the initial efficiency and cycle characteristic exhibit large standard deviations in both initial efficiency and cycle characteristic and large variations in initial efficiency and cycle characteristic were observed for five secondary batteries.

INDUSTRIAL APPLICABILITY

A lithium-ion secondary battery having an excellent initial efficiency and cycle characteristic can be obtained by using the silicon oxide of the present invention as the negative electrode active material and by using the negative electrode material for the lithium-ion secondary battery of the present invention. Accordingly, the present invention is a technology useful in the field of secondary batteries.

REFERENCE SIGNS LIST

1: Positive electrode, 1a: Counter electrode case, 1b: Counter electrode current collector 1c: Counter electrode, 2: Negative electrode, 2a: Working electrode case 2b: Working electrode current collector, 2c: Working electrode, 3: Separator 4: Gasket, 5: Vacuum chamber, 6: Raw material chamber, 7: Precipitation chamber 8: Raw material container, 9: Mixed pelletized raw material, 10: Heating source 11: Precipitation substrate, 12: Silicon oxide

What is claimed is:

1. A silicon oxide in the form of powder, which is used for a negative electrode active material of a lithium-ion secondary battery and is represented by $SiO_x$, wherein,
when the silicon oxide is measured by use of an X-ray diffractometer comprising a sealed tube light source as a light source and a high speed detector as a detector, a halo is detected at $20°≦2θ≦40°$, and a peak is detected at the highest quartz line position therein, and the height P1 of the halo and the height P2 of the peak at the highest quartz line position satisfy P2/P1≦0.05.

2. The silicon oxide according to claim 1, wherein x of the $SiO_x$ is 0.7<x<1.5.

3. A negative electrode material for lithium-ion secondary battery, containing not less than 20 mass % of the silicon oxide according to claim 1.

* * * * *